United States Patent [19]

Brown

[11] 4,343,670

[45] Aug. 10, 1982

[54] APPARATUS AND PROCESS FOR HOT-STAMPING CONTAINERS

[75] Inventor: Robert Brown, New York, N.Y.

[73] Assignee: Rheological Systems, Inc., West Babylon, N.Y.

[21] Appl. No.: 100,334

[22] Filed: Dec. 5, 1979

[51] Int. Cl.$^3$ ........................ B44C 31/00; B32B 31/00; C09J 5/00

[52] U.S. Cl. .................................... 156/233; 156/238; 156/249; 156/309.9; 156/540; 156/542

[58] Field of Search ............... 156/230, 231, 233, 234, 156/238, 239, 528, 249, 251, 540, 542, 309.9, 445, 443, 471, 470, 481, DIG. 1, DIG. 2, DIG. 3, DIG. 5, DIG. 8, DIG. 9, 583.1, 583.3, 583.8, DIG. 24, 583.91, DIG. 37; 264/267, 268; 425/87, 28 D, 416, 418, 457, 400, DIG. 29; 101/379, 406; 72/395, 465

[56] References Cited

U.S. PATENT DOCUMENTS

| | | | |
|---|---|---|---|
| 1,650,666 | 11/1927 | Toepfert . | |
| 1,931,147 | 10/1933 | Hampel | 156/234 |
| 2,133,920 | 10/1938 | Goessling | 101/38 |
| 2,195,135 | 3/1940 | Serai | 101/35 |
| 2,491,947 | 12/1949 | Bardash | 101/35 |
| 2,739,532 | 3/1956 | Fernandez | 101/126 |
| 2,746,380 | 5/1956 | Gottscho | 101/35 |
| 2,920,556 | 1/1960 | Medert et al. | 101/38 |
| 3,030,881 | 4/1962 | Friedman | 101/7 |
| 3,049,990 | 8/1962 | Brown et al. | 101/93 |
| 3,094,920 | 6/1963 | Priesmeyer | 101/41 |
| 3,135,198 | 6/1964 | Kinglsey | 101/407 |
| 3,139,368 | 6/1964 | Flood | 156/543 |
| 3,228,326 | 1/1966 | Childress | 101/114 |
| 3,359,891 | 12/1967 | Price | 101/35 |
| 3,411,438 | 11/1968 | Reader et al. | 101/8 |
| 3,418,924 | 12/1968 | Kinglsey | 101/9 |
| 3,608,480 | 9/1971 | Sciame | 101/7 |
| 3,640,213 | 2/1972 | Schwartzbach | 101/8 |
| 3,659,522 | 5/1972 | Gilbert | 101/35 |
| 3,659,523 | 5/1972 | Olsen | 101/38 |
| 3,745,920 | 7/1973 | McKay | 101/329 |
| 3,813,268 | 5/1974 | Kerwin | 156/238 |
| 3,867,881 | 2/1975 | Blattner | 156/234 |
| 3,911,812 | 10/1975 | Flynn et al. | 101/1 |
| 3,961,575 | 6/1976 | Rodabaugh | 101/9 |
| 4,029,006 | 6/1977 | Mercer | 101/35 |
| 4,097,325 | 6/1978 | Schnier | 156/309.9 |
| 4,098,184 | 7/1978 | Okada et al. | 101/41 |
| 4,099,459 | 7/1978 | Pfleger | 101/34 |
| 4,122,768 | 10/1978 | Dubuit et al. | 101/39 |
| 4,129,074 | 12/1978 | Beaver et al. | 101/35 |
| 4,132,583 | 1/1979 | Hodgson | 156/542 |
| 4,173,506 | 11/1979 | Pletcher | 156/309.9 |
| 4,175,993 | 11/1979 | Robertson | 156/583.1 |

*Primary Examiner*—Edward C. Kimlin
*Assistant Examiner*—Louis Falasco
*Attorney, Agent, or Firm*—John A. Young; Larry J. Palguta

[57] ABSTRACT

Apparatus and process for hot-stamping molded plastic containers in which the container is moved past a heated die having a platen with a printing die, the die being floatably movable so that linear uniform pressure is exerted between a confronting container surface and die surface. As the container moves across the die surface, it is rotated so that foil which is pinched between the container and die is transferred onto the surface of the rotatable container. The uniform linear pressure between container and die, transfers foil to the accompaniment of rotation of the container so that defect-free lamination of foil is transferred onto the container surface to form decorative or alpha numeric information. The operation is continuous, with successively spaced containers moving into printing position relatively to the die, where the hot-stamping operation is repeated. Containers are automatically removed after printing, and successive containers supplied either manually or automatically.

11 Claims, 22 Drawing Figures

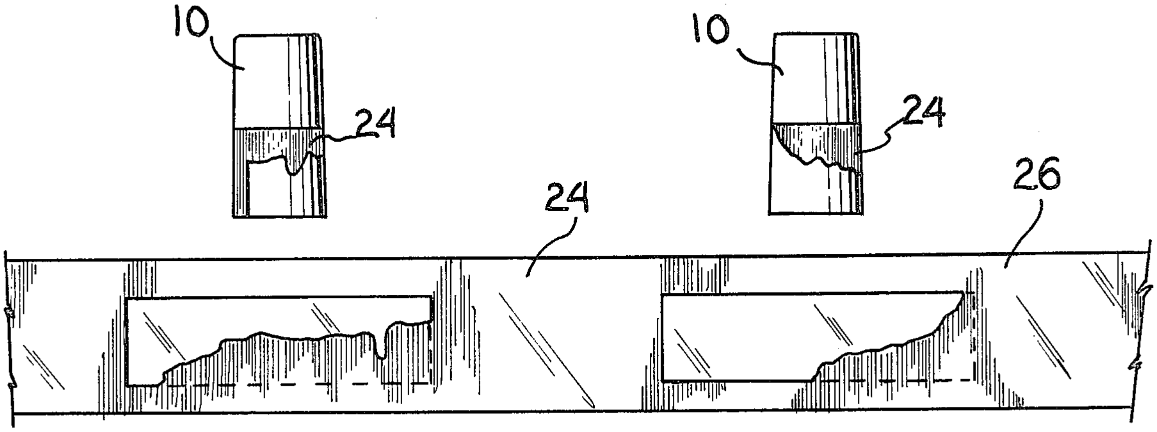
Fig. 18
Fig. 19
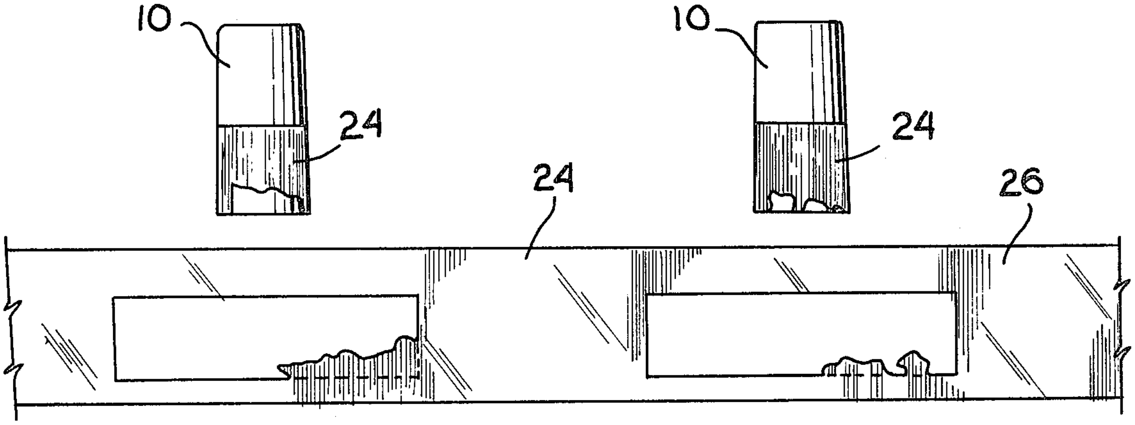
Fig. 20
Fig. 21
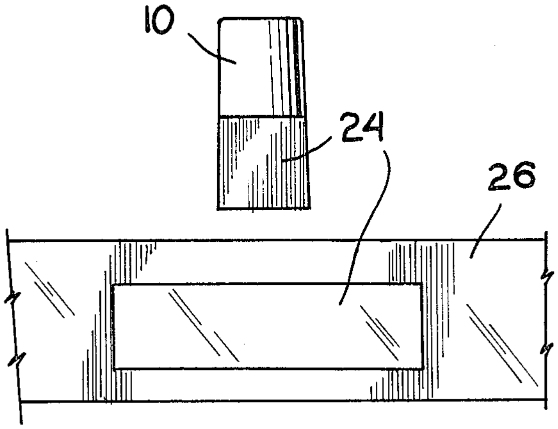
Fig. 22

APPARATUS AND PROCESS FOR HOT-STAMPING CONTAINERS

TECHNICAL FIELD

The process and apparatus are intended for hot-stamping foil onto plastic containers by applying pressure in a critical amount between the two confronting surfaces and under sufficient temperature known as the visco-elastic range temperature, to ensure the hot-stamping of the foil onto the surface of the container.

BACKGROUND ART

Hot-stamping is a process whereby a transfer of material from a foil onto a thermoplastic surface is achieved by the application of heat and pressure to the foil and plastic. The transfer is generally in the form of a print, or copy, or a design, all of which is determined by the die effecting the transfer. In an actual deposition, the plastic is pressed against the die, sandwiching the foil between the plastic and die, effecting material transfer from the foil carrier to the plastic surface. When the transfer of material to the plastic surface occurs, it is absolutely necessary that the die effecting the transfer and the foil, be in contact with that part of the surface of the plastic which must be printed or decorated. Any lack of contact, no matter how small, will result in no deposit. Since the entire surface to be printed must then be in contact with the die, and under high pressure and high temperature to effect transfer, the surface of the plastic deforms due to to a number of causes:

A. Relief of stresses and strains and, in some cases, memory;

B. Change of state (melt);

C. The introduction of laminar flow of the plastic at a multi-molecular depth from the surface.

To understand the nature of the surface of molded plastic, it must be realized that when a plastic resin is molded (either by injection or compression, or blow-molded), one does not get a geometrically precise item. In the plastic surface, there are many hills and valleys which occur. These hills and valleys cause numerous problems for hot-stamping operations. Since contact is absolutely essential, it can be readily understood that various ripples and deformations in the plastic surface would prevent surface-to-surface contact. One way of overcoming this problem is to press the die against the plastic with such force that the surface to be printed is essentially equalled out to allow contact. What happens in this case, is that it can only be done safely at low temperatures, so that the types of deformation described previously do not occur; what does occur is, a de-bossing of the plastic surface takes place, not true, permanent, hot-stamping.

It is possible to hot-stamp by vertically pressing a heated die into the plastic, and this is called vertical, or flat, stamping. For using a curved surface (as, for example, a cylindrical bottle or lipstick tube) where more than 25 percent of the surface is to be stamped, then it is a common practice to roll the plastic on a mandrel past a die (flat or curved), and we call this peripheral hot-stamping. The present invention as described is applicable to both flat and peripheral stamping. It is, however, principally directed to peripheral stamping. The most significant difference, however, between the two forms of hot-stamping is that we deposit material over a broad area under a moderate force as quickly as a third of a second with flat stamping; we deposit material in the peripheral type stamping over a very small area under much greater force in, perhaps, 0.005 second, with the described peripheral stamping. We are theoretically printing on a line (a round surface tangentially contacting a flat surface).

These differences become significant when one considers the contribution of the leaf, or foil, to the phenomena of hot-stamping. Theoretically, when the foil material is deposited, it is not only mechanically pressed into the plastic, but should also combine chemically with the plastic being decorated. Thus, temperature, pressure, dwell time and the chemical nature of the leaf, are also much more critical when following a peripheral stamping, as opposed to the flat stamping. In the present invention, flat-stamping and peripheral stamping are both achievable because the adaption of the mechanism to the rheological considerations allows it to function identically in flat stamping as it does when applied to peripheral stamping, albeit peripheral stamping remains much more critical.

DISCLOSURE OF THE INVENTION

In the present invention, there is utilized the relationship between mechanical deformation in plastics (strain, flow, melt, etc.) to temperature when the plastic is under stress; and it is the purpose of the invention that by this utilization, true hot stamping will occur at very high production rates. In the graph of FIG. 16, the basic relationships are shown between temperature and deformation (strain) when the stress (applied force) and the duration of stress are constant. In practice, neither the stress nor its duration are constant, but for purposes of analysis we use the graph to show the phenomena involved. In general, what we have are three states for the plastic under stress and increasing temperature:

A. The "glassy" state, whereby the deformability of the plastic is so low that the curve virtually merges with the abscissa axis. This state exists at low temperature, and hot-stamping attempted at this end of the scale of the curve would require de-bossing of the plastic to effect a print of any sort. Since any deposit of the leaf requires some temperature, hot stamping would probably take place at the glass-transition stage, designated $T_G$. At this point deformations become reversible, and the hot stamping print would break off.

B. The "rubbery" state is shown as the area with a long plateau on the curve. At these temperatures the polymer can develop high reversible deformations which reach their limit (under the given conditions of force action) at a distinct plateau. Hot-stamping simply could not be done successfully in this area.

C. The viscoelastic (and/or viscofluid) state exists to the right of the rubbery state up to the thermal degradation of the polymer. The basic characteristic of this state is the development of indefinitely high irreversible deformations. It is in the transition temperature range ($T_f$) where hot-stamping can be performed at maximum efficiency.

Attention should be drawn to the fact that no definite temperatures can be named for the transitions from one state to the other. This is because the different states of the polymers are due to differences in the mobilities both of the macromolecules as a whole, and of their segments, which are capable of moving relative to one another as a consequence of the flexibility of chain macromolecules. In the glassy state, neither the macromolecules nor their segments can alter their relative arrangement under the action of thermal movement alone, because the energy of interaction of the segments, and, even more, of the macromolecules, is much higher than the energy of thermal movement. In the rubbery state, the energy of thermal movement becomes sufficient to overcome the forces of interaction between segments, but is too low to overcome the forces of interaction between macromolecules as a whole. Therefore, individual segments are displaced, and the coiled macromolecules are able to straighten out under the influence of external forces, and to recoil once these forces are removed. These changes in the conformation of the macromolecules are observed as fairly large, reversible deformations in the plastic. In the viscoelastic state, both segments and the macromolecules as a whole are displaced, giving rise to irreversible changes (this is the region of melt and flow of material); thus, the three states characterize the internal mobility of polymeric bodies, which increase continuously with rising temperatures.

With the foregoing theoretical considerations in mind, we can make the following inferences:

A. True hot stamping is not possible in the glassy state because the energies of interaction are too large to allow chemical bonding, and the force which is required to work the surface so that the hot-stamping foil is fused into the surface is too large to be practical.

B. Hot-stamping in the rubbery state is not plausible because the surface deformation is reversible, and mechanical surface bonding of the foil will be broken once the applied force has been removed. Chemical bonding is very unlikely because the energy of interaction of the macromolecules and their segments is too large.

C. The viscoelastic state, where bonding energies are low, and the material flows, and deformation changes are irreversible, is the only region where true hot-stamping can take place, since chemical bonding can readily be achieved and the surface flow will allow the die to virtually act as a mold.

The last conclusion forms the basis of the invention, for what we wish to accomplish is the accuracy of molding in the print in a very short time span, and still allow the chemical bonding to occur; and we want this to be only a surface phenomenon. Reviewing the thermochemical curve of FIG. 16 once more, we look at the beginning of the rise of the curve at the extreme right. We are observing the onset of the viscoelastic region and of melt and flow, and to obtain optimum hot-stamping for a surface depth of perhaps $0.001^n$–$0.005^n$, we would want to do this in the area designated $t_{s1}$–$t_{s2}$. Since the time of the applied force, plastic composition, and other factors we have discussed will cause displacements in the curve such that absolute figures are not possible, the means of determining the optimum hot-stamping region constitutes one of the main features of the invention.

Since we are dealing with surface phenomena in hot-stamping, we associate this for a given temperature and a force applied to the surface of the plastic via die, realizing that a counter-force will be exerted against the die which is a function of the following characteristic:

A. the plastic composition;
B. the extent (height) and depth of the surface flow;
C. the velocity of movement of the plastic piece past the die (or vice versa). This would be the dwell time of the force applied perpendicularly to the plastic surface;
D. friction, if any;

E. the force due to the momentum of the impact of the plastic piece against the die;
F. the thickness and composition of the piece being hot-stamped; and
G. compliance and/or rigidity of the plastic.

If we were to examine such common articles as lipstick case caps, for example, it would be possible to find that the geometrical surface has numerous imperfections and rather large variations in the wall thickness of the item. The variations in the surface and the thickness produce variations at any given point in the vector force, which is a summing of all the forces at play at that point; thus, the applied force from the die is the only determinant which can be controlled externally, and this must be a variable force because there is a certain vector at any given point (vertical line) along the circumference of a round item, which is a characteristic of that item and which will allow a virtually perfect hot-stamp at that point or line if, for a given temperature, we are operating at an optimum region of the visco-elastic region.

Still referring to a typical application of the invention, as connected with a lipstick cap, in considering its circumference laid out in a flat, and then the height of the cap and the length of its circumference are now the height and length of the die. If the die is mounted on the mechanism which puts a variable compliance behind the die such that when the die is pressed against the plastic, it can move in accordance with the desired different compliance rates distributed across its length and height, we have a system termed a "force matrix". This is shown schematically in the drawings later to be developed. When each of the compliances are varied to produce a successful print, which will withstand various tests for durability, we can then produce a successful hot stamp. Since we function with the hot-stamping in the onset of the viscoelastic state, and the die is now functioning as a mold (it should be kept in mind that only a small portion of the surface is flowing and that we are at the beginning of irreversible changes in deformation), we wish the die to manipulate the surface to its shape. In order to do this, the die mechanism must react to the counter forces of the plastic piece by movement, and it should be movement in all directions of freedom. This can be accomplished by a gimble system which is also shown in the drawings.

In the gross description of the phenomena described, we have not included factors such as hysteresis, heat absorption gradients, etc. All of these factors affect the ultimate vector force. However, regardless of these factors, there is a vector force which, as mentioned previously, is a characteristic of the piece being hot-stamped for a given temperature in a given region in the visco-elastic state. A strain gauge, or other type of transducer, located in the areas near such compliance, will measure the force which the die "sees", and which is the vector force. The output of the transducer, if passed through an electronic integrating network and exhibited on an oscilloscope screen, will show a characteristic square wave.

We have described the phenomena of hot-stamping, and this invention is the only which actually functions in keeping with the phenomena described hereafter as:

A. One in which a hot-stamping takes place only in the visco-elastic region of the thermomechanical curve and according to a system in which there can be infinitely adjusted temperature and pressure within limits to determine the appropriate region;

B. The die is free to move in all directions of freedom and can be adjusted in all directions of freedom;

C. The variable compliances are in the form of miniature air cylinders, or springs, so that compliance can be formed either by air pressure (or by mechanical spring force), with each cylinder adjusted by a needle valve. Air pressure in each cylinder is read on the gauge associated with each cylinder. However, these compliances may also be springs as noted, and they can be of various sizes and spring rates distributed as shown in the drawings;

D. There are utilized means to convey the plastic piece past the die; this normally being in the form of a belt conveyor and it is imperative that the movement of the plastic be in a straight line at the point of passing the die and not in a radial path;

E. On the conveyor belt or conveying means are fixed mandrels in which the plastic piece is held as it is conveyed past the die. In the case of containers where the mouth is smaller than the body, a special and unique tooling is usable on the conveyor or mandrel station. All these items, mandrel stations and mandrel mountings, are adjustable, and serve to allow hot-stamping at previously unattainable production rates;

F. The present mechanism handles and advances the foil for hot-stamping operations, the foil being very thin and maintained at a certain prescribed tension to stamp properly. If the foil is not properly handled, it tends to wrinkle, scratch, or otherwise deform in a way which prevents a good print;

G. Appropriate transducing and circuitry is provided to obtain force distribution appropriate for the hot-stamping process which allows determination of the characteristic "force matrix" by viewing the output of the transducers on an oscilloscope screen.

All of the foregoing items represent areas in which these factors can be made to work in concert. They form the actual and theoretical mechanics which support the present invention.

BRIEF DESCRIPTION OF THE DRAWINGS

FIGS. 18–12 illustrate a container and tape with faulty "pick-off" or hot-stamping by which the container is improperly hot-stamped causing an incomplete transfer of foil from the tape onto the container; and FIG. 22 illustrates a container properly hot-stamped by the apparatus and method of the present invention.

BEST MODE FOR CARRYING OUT THE INVENTION

Figure 1:
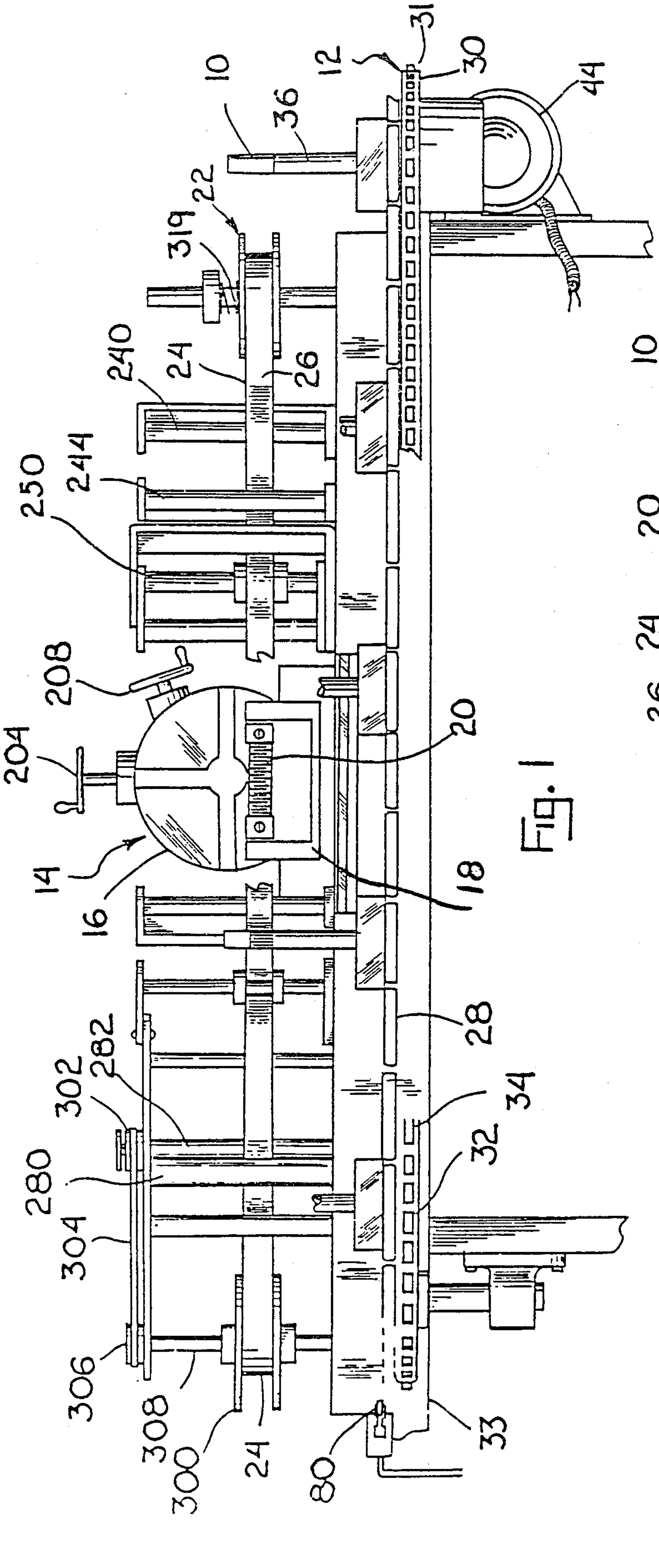
FIG. 1 is a side elevation view of the apparatus, looking in the direction of the front face of the die and illustrating the guide for the leaf-tape used for printing the containers.
Figure 2:
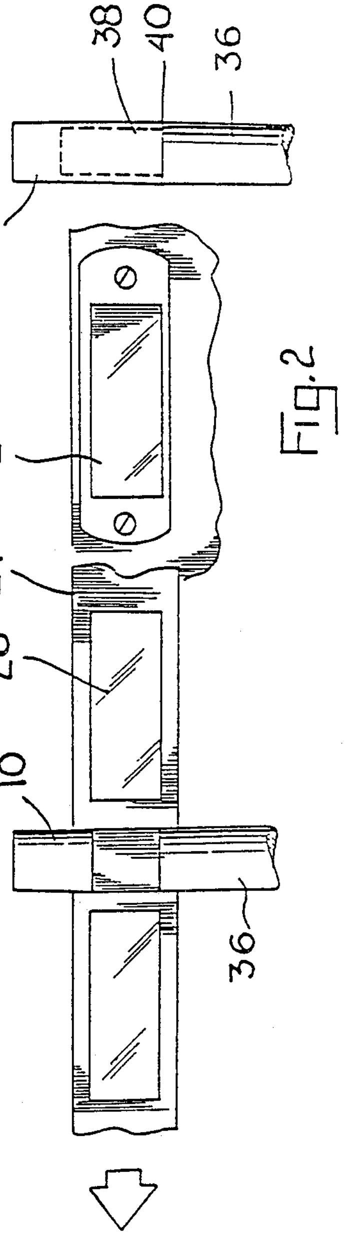
FIG. 2 is a detail view of the mandrel for mounting the containers, showing in fragmentary view the tape and leaf as it overlies the die, and the successive positions of the mandrel and container after it has been imprinted, with the arrow illustrating the direction of movement of the container and mandrel as well as intermittent movement of the tape.

Referring to FIGS. 1–5 and 15, there are four major subassemblies which are utilized in imprinting a container 10: a container carrier system designated generally by reference numeral 12 upon which the containers are mounted for carrying them into hot printing position and from which they are ejected after printing; printing die subassembly designated generally by reference numeral 14 and consisting of an adjustable head 16, heater block 18 and flexible printing die 20; a foil supply subassembly designated generally by reference numeral 22, its function being to supply foil 24 which is carried on a flexible tape 26 into position relatively to the die, so that under heat and pressure the foil can be transferred onto the container with the imprint and impression determined by the printing die 20; an air control system 27 for removing the printed container and advancing the tape; and an electrical control system 29 for controlling machine operation, speed and heating of the die.

Each of these subassemblies will be separately considered, and then their operation together will be explained under "OPERATION".

CARRIER SUBASSEMBLY FOR CONTAINERS

Referring to FIGS. 1, 2, 3, 7, the carrier subassembly 12 consists of a plurality of articulated carrier treads 28, which are flexible joined at their ends to enable them to turn endlessly over a drive sprocket 30 at one end 31 and an idler wheel 32 at the opposite end 33 of belt 34, which is made up of a number of the treads 28. At spaced locations, and carried by the treads, are right mandrel posts 36, each of which has a reduced diameter upper end 38 providing a shoulder 40.

An inverted cap or container 10 is supported on the upper end of the mandrel 38 and bears against shoulder 40. The mandrels 36 are spaced apart by a greater distance than the total length of foil to be wrapped over and form a lamination on the surface of the cap 10. The belt 34 is driven by means of a motor 44, and the caps 10 are manually or mechanically positioned on the mandrel in the manner shown in FIG. 2.

At the lower end of the mandrel is a post 46 (FIG. 7), and arbor 48 received in a bearing 50 disposed within bearing recess 52 of one of the associated treads 28.

Each mandrel is adjustably positioned on an associated tread 28 and, once adjusted, it is clamped in that position thereafter. Still referring to FIG. 7, the mandrel or tread block 29 is securely held by bolts 54 to the conveyor belt 56.

When the tread block 29 reaches its operative position relative to the die assembly 14, it slideably engages a guide 58, providing a guide surface 60 engageable by the complementary surface 62 of the mandrel block 29. This accurately locates the position of the container 10 in relation to the die assembly 14. The guide 58 is accurately positioned by means of a carrier arm 64 having two adjuster stems 66, 68 which determine the base line for the tread 28 and its associated upstanding mandrel 36 and cap 10.

The tread block 29 is biased against the guide 58 by means of a compressed spring 72 which is captured between a recess 74 in table 76 and a second recess 78 of base guide plate 80. The plate 80 also has a friction cam 81 secured by bolts 83 and a friction face 85 which engages the mandrel post 36, causing it to rotate as the mandrel moves past the die assembly 20.

Cap 10 is thus accurately located both vertically (FIG. 2) and laterally, i.e., toward and away from the flexible printing die 20 (FIG. 2), and likewise are each of the other caps mounted on the other associated mandrels as the mandrel is caused to move past the flexible die assembly 20.

It is the purpose of the conveyor system not only to bring the cap into printing relation with the die, but also to remove it from the vicinity of the die after the printing has been completed and the article has its desired lamination of material which serves as a decoration, logo, information legend, or the like.

The conveyor system moves the printed cap 10 into a position relative to a cam follower 84 which operates an air ejection system 82 (FIG. 5), blowing off the finished cap and making available the mandrel for loading a new and unprinted cap.

Hot-Stamping, Roll-Marking Die Subassembly

Figure 7:
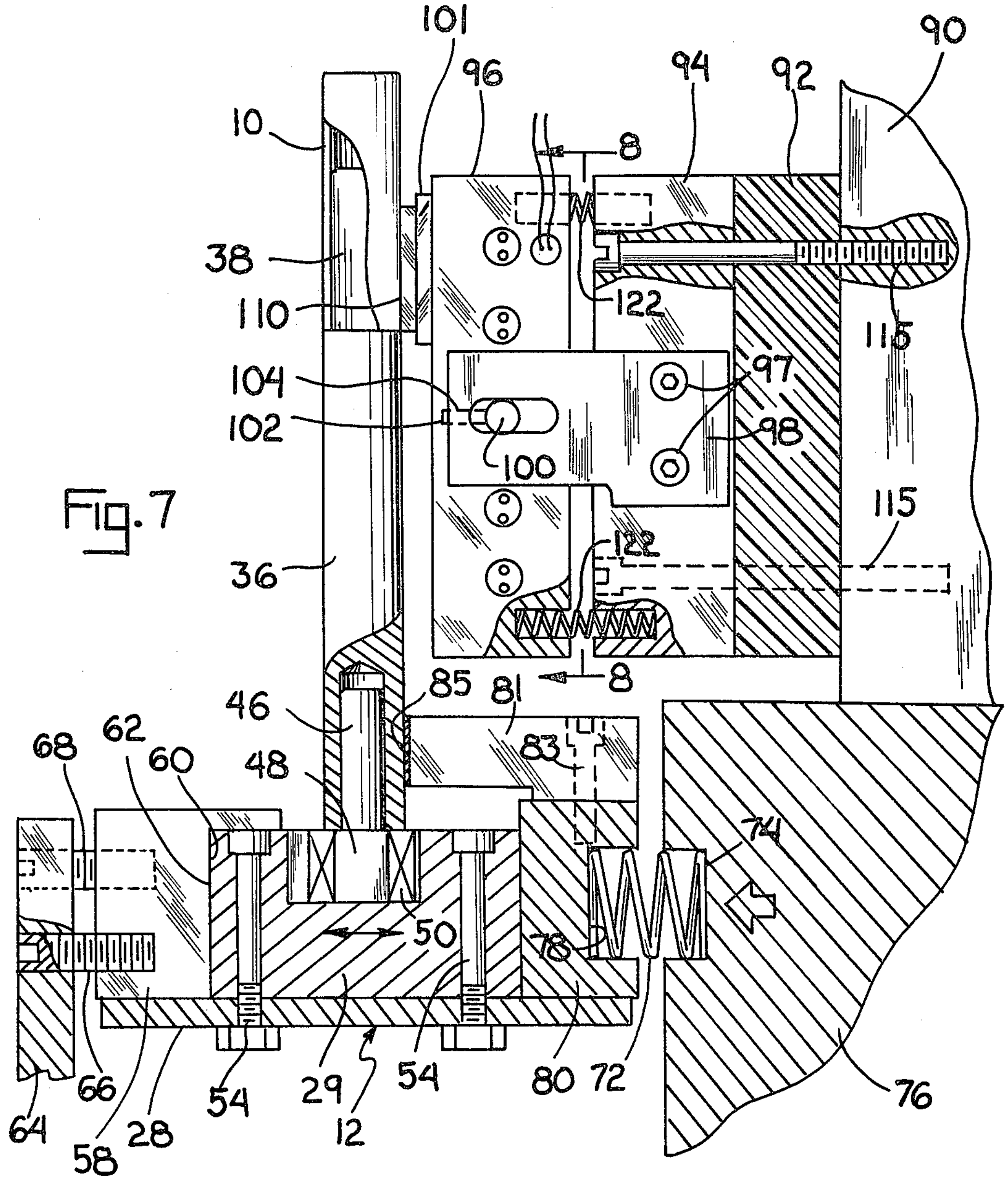
FIG. 7 is an enlarged detail view of the mounting means for the container and the hot-stamping die.
Figure 8:
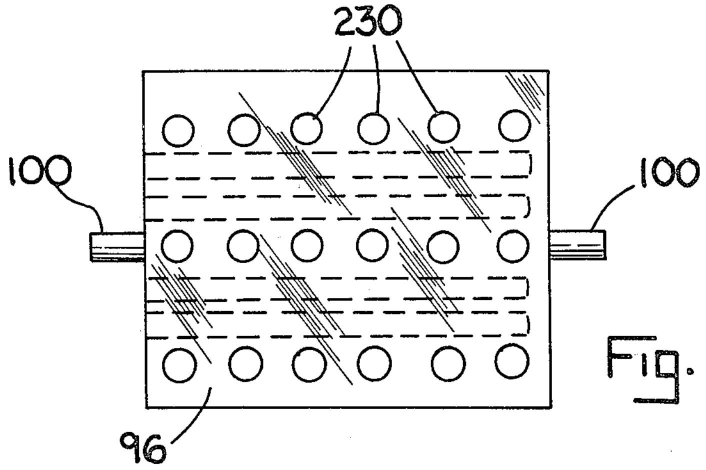
FIG. 8 is a detail view of the heater block.

Unlike many previous foil printing systems which employ hot stamping techniques, the die in the present invention is relatively stationary; that is, the cap container moves past the die and the die remains relatively stationary, or static, but does have universal type movement, which is one of its characteristics. The hot stamping die consists of an adjustable head 90 (FIGS. 7,15), a heat insulating block 92, a support block 94, and a universally movable heater block 96 which is carried by support block 94 through a support or suspension flange 98 and support pins 100, which are adjustably movable by set screws 102. As indicated in FIG. 7 and exploded view FIG. 15, the suspension pins permit the heating block to be universally movable relative to the support block 94. Mounting plate 99 and die plate 101 are mechanically secured together through bolts 107 received through aligned openings 103 and received in threaded openings 105 in mounting plate 99. A mortise-tenon connection 108 enables the mounting plate to be withdrawn and replaced from time to time relative to the floating heating core 96, to accommodate different die plates 101. On the face of the die plate is a rubber or elastomeric flexible die 110 which is configured in a way to produce the desired design, logo, alpha-numeric printing, etc., on the foil as it is transferred onto the confronting face of the cap 10.

Figure 13:
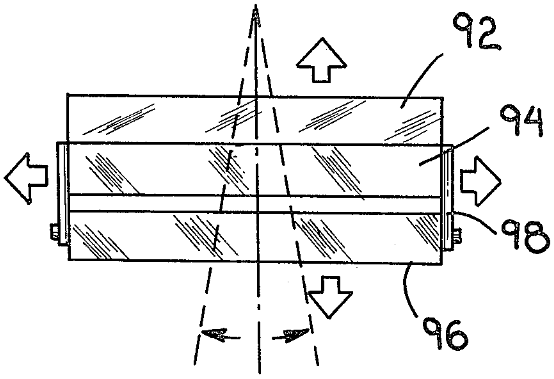
FIGS. 13, 14 are detail views of the container and die during printing.
Figure 14:
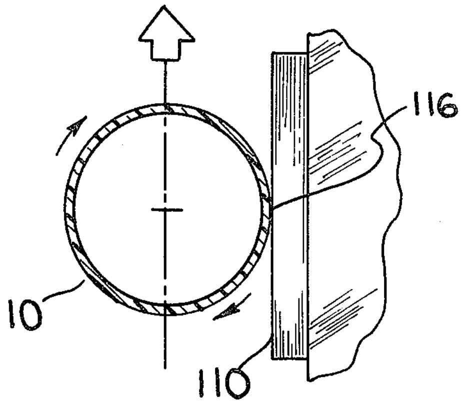
Figure 15:
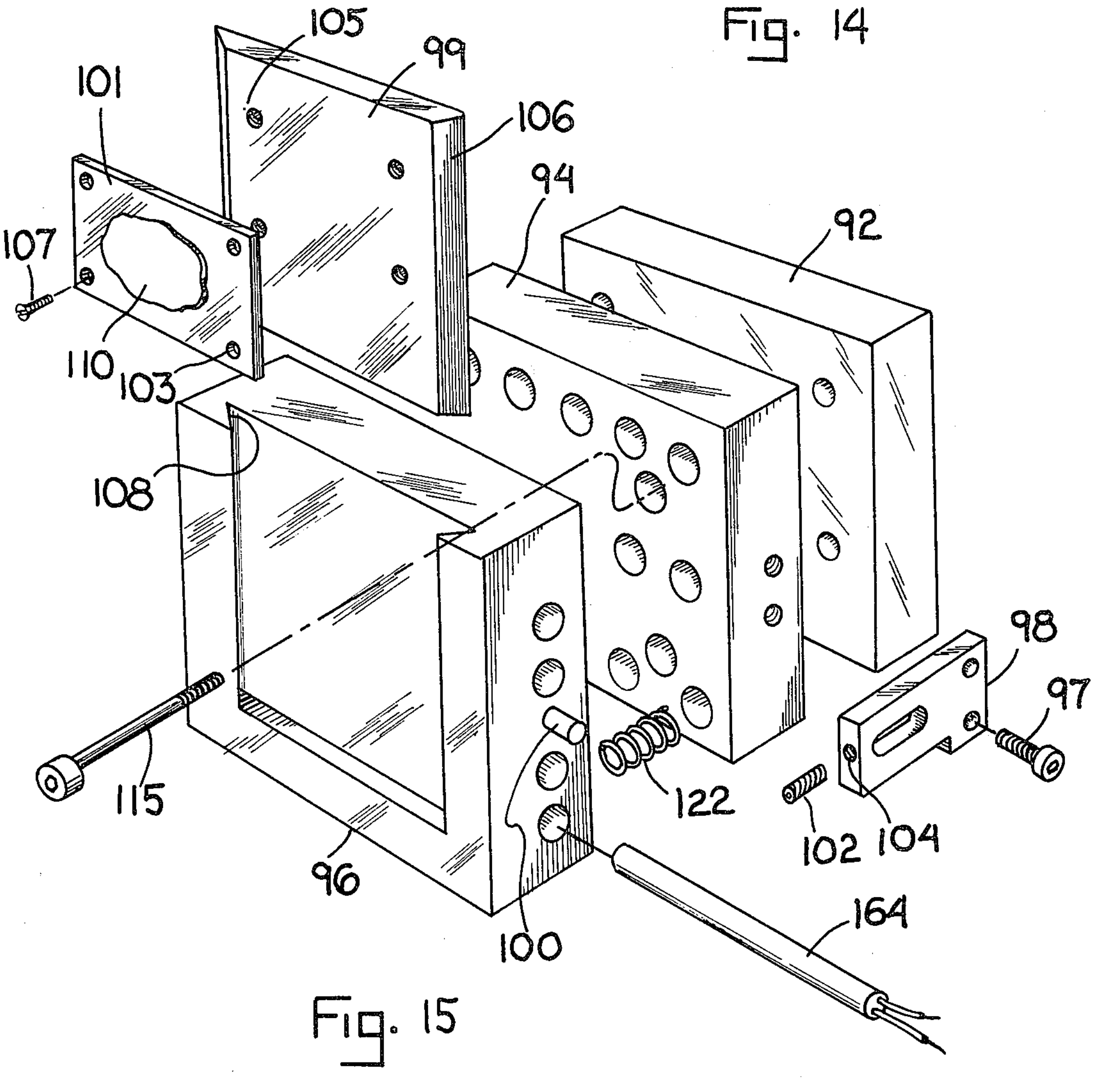
FIG. 15 is an isometric exploded view of the die assembly.

This universally movable relationship of the die plate 101, mounting plate 99 and heating core 96 relative to the cap 10, insures a linear engagement (FIG. 13) between the die and cap. There is also a single point contact 116 (FIG. 14) when viewing the control between the die and cap in the entire degree of contact cross-section (FIG. 14). What provides the universality of movement of the die relative to the cap, is the arrangement of single point suspension pins 100 and a series of springs 122 (FIG. 7) which enable the variable positioning of the die to maintain the desired linear engagement between the die and the cap. The flexible nature of the rubber die 110 and the described universal movement maintain the linear engagement between the die and the cap (FIG. 13), regardless of the inevitable variants in cross section of the molded cap 10, which cannot be commercially molded to precise dimensions.

Figure 17:
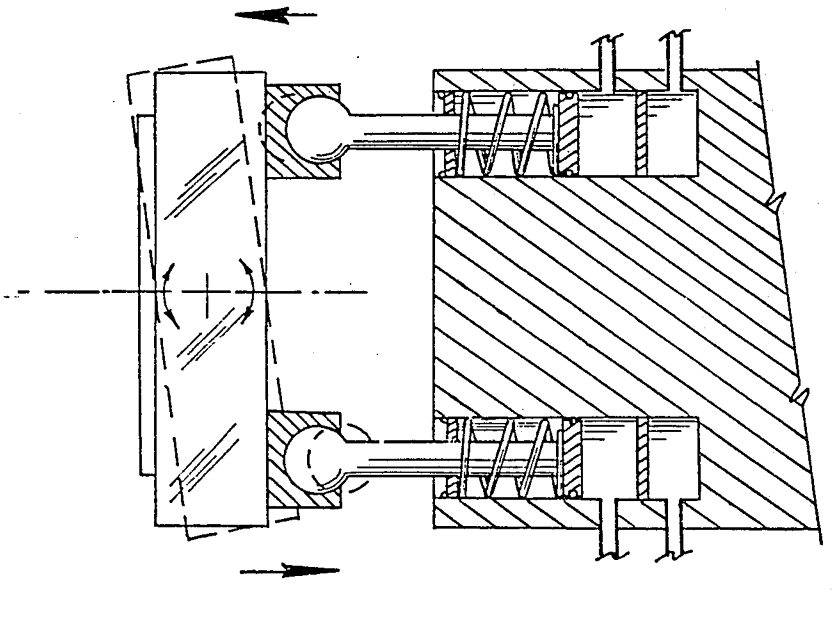
FIG. 17 illustrates an alternative method and apparatus for fluid retraction of mandrel.

Shown in FIG. 17 is a second alternative method and apparatus that is a hydraulically floatable die which develops a complete floatation of the die on the X—X, Y—Y, and Z—Z axes ensuring complete linear engagement which is productive of total pick-up foil from the tape and achieves the results shown in FIG. 22.

Figure 9:
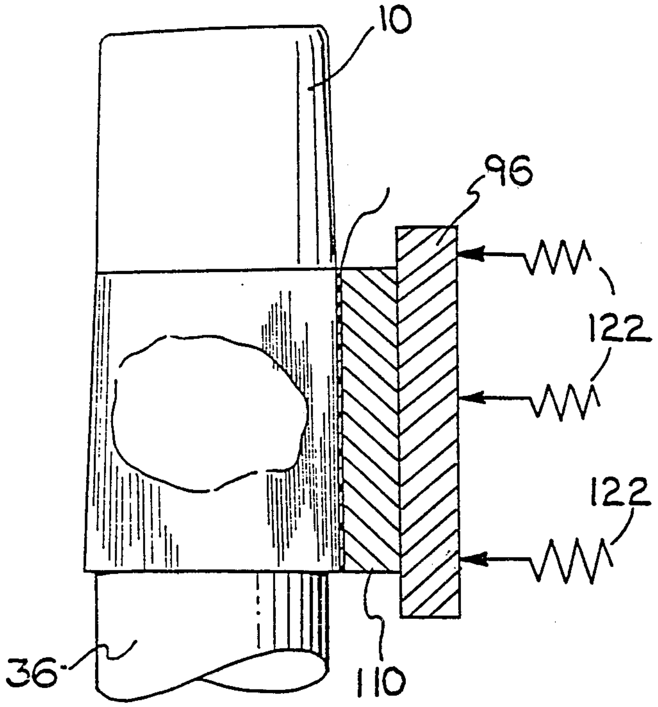
FIGS. 9, 10 are enlarged schematic detail views of the container and mandrel showing how the container flexes under pressure to maintain linear contact.
Figure 10:
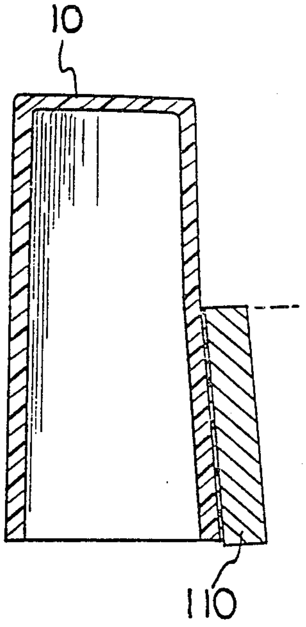
Figure 11:
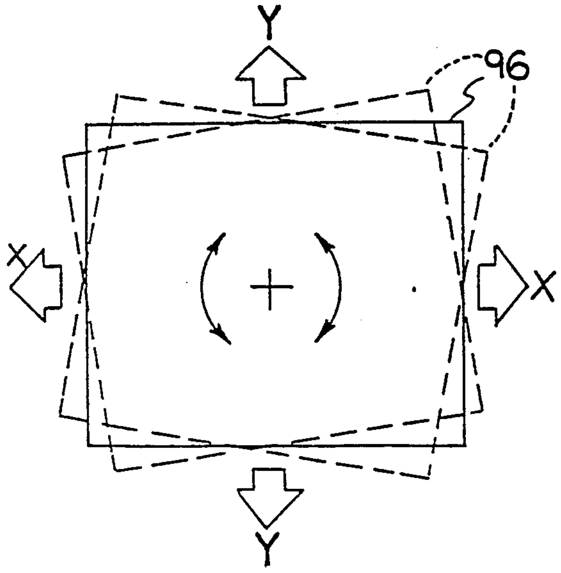
FIGS. 11, 12 illustrate the adjustable movements of the die in vertical, horizontal, lateral movements, as well as angular or rotational movements, in an X—Y and a Y—Z plane.
Figure 12:
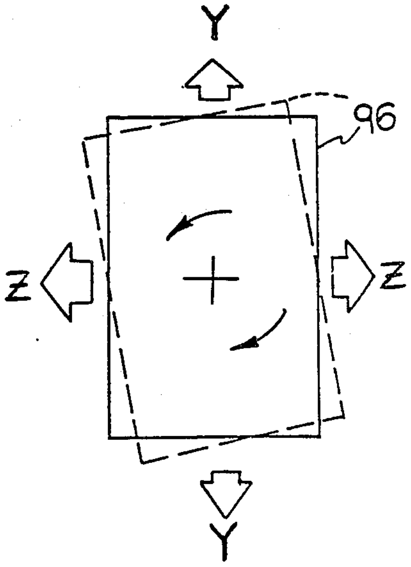

Referring to FIGS. 9, 10, there is schematically illustrated a number of springs 122 which operatively bias the die plate 101 and mounting plate 99. Rubber die 110 thus linearly engages the cap 10, deforming the cap 10 and insuring at all times the occurrence of a linear engagement pressure regardless of dimensional irregularities in the cap so that there will be skip-free transfer of foil onto the surface of the cap 10.

The heater block 96 has a plurality of spring recess openings 230, each of which receives a spring 122 and it is the rate, number and location of the springs 122 developing a biasing effort on the heater block 96 which develops the floatable linear engagement described.

ELECTRICAL CONTROL SYSTEM

Figure 6:
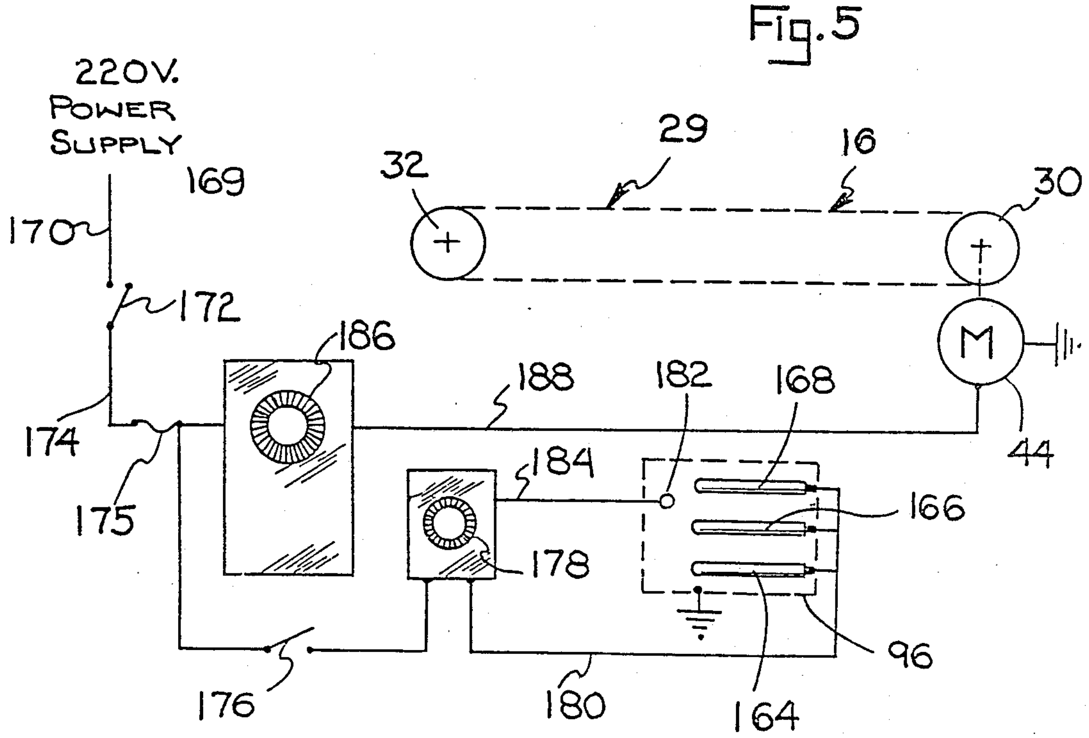
FIG. 6 is a schematic view of the electrical system for controlling the speed of operation and the heating of the die.

Within the support block 94 and heater block 96, there are a plurality of heater elements in the form of electrical resistor elements 164 (FIG. 6), 166, 168, mounted in heater block 96 and supplied from a 220 volt power supply 169, and conductor 170 and closed switch 172, conductor 174, switch 176, and thermostat 178, conductor 180, to the resistor elements, thence to a thermocouple 182, conductor 184, and back to the thermostat. The thermostat acts as an on-off switch so that a desired temperature supplied by the resistor heater elements 164–168 will be produced and the thermocouple, upon attaining the desired temperature, signals such through conductor 184 to the thermostat 178 acting as a servo control to maintain the optimum temperature.

As shown, the same power supply 169 operates through 174 and fuse 175, speed control 186, conductor 188, to motor 44 for driving the carrier or conveyor 16.

Foil and Tape Dispensing, and Positioning Subassembly

The foil 24 is provided on a flexible, relatively thin gauge tape 26 consisting of mylar.

The foil tape is provided from a supply reel 22, and is threaded first over a direction-imparting spindle 240 (FIG. 4) which is adjustably movable in the direction of the double arrow-headed line 242, then over a second floatable spindle 244 having a relief spring 246 which enables the spindle carrier 247 and tape to move back and forth in the direction of the double arrow-headed line 249 controlling tension of the tape and permitting it to move progressively in the direction of the arrow 248. The tape next passes over spindles 250,252 received uprightly on a pivot bar 253 pivoted at 254, in order to provide a length of tape 26, which is wrinkle-free, is under a preferred tension, but displaced slightly away from the front face of the rubber die 110.

Figure 3:
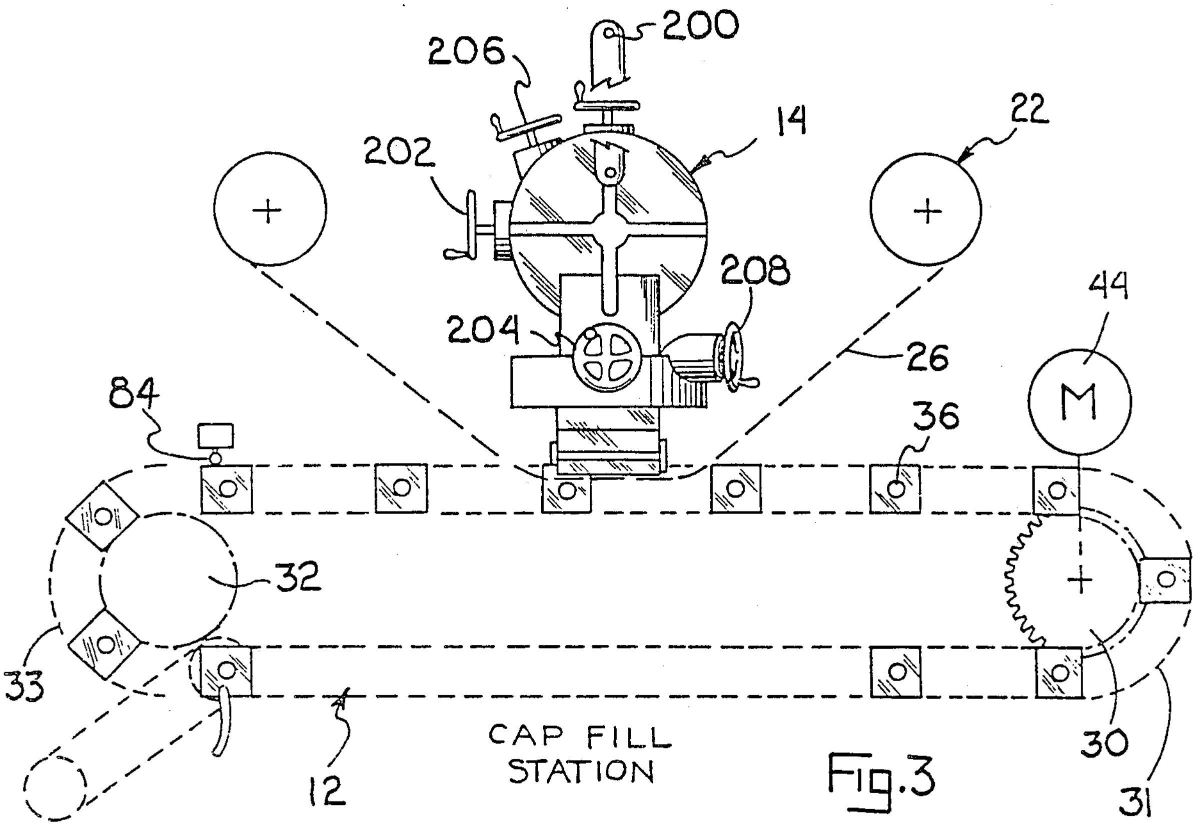
FIG. 3 is a view looking downwardly upon the machine, illustrating the continuously movable conveyor upon which mandrels are mounted and with the supply leaf illustrated schematically relative to the die.

The die 10, in addition to being universally movable to maintain the linear engagement, is precisely located horizontally (X—X axis), vertically (Y—Y axis), and laterally (Z—Z axis) by a combination of adjuster handles 200, 202, and 204 (FIG. 3).

Additionally, the die is positionable angularly in the X—Y plane by an adjustor handle 206 and in the Y—Z plane by adjustor 208.

The die is therefore precisely adjustable during setup in all three axies and angularly, so that the amount of floating spring loaded movement required to maintain linear uniform pressure, relative to the cap 10, is a minimum.

It should be noted that the length 26 spans the distance between spindle 252 and a second spindle 251 on arm 256 pivoted at 258 and pivoted clockwise thereabout by a biasing spring 260. The tape next passes over spindle 270 on spindle block 272 which is biased by spring 274 and idler spindle 278. The tape is driven between the nip of two drive rollers 280,282 operated by a shaft 284 and responsive to a rack and one-way ratchet 288,290 which drives shaft 284. The rack and ratchet is driven by piston rod 291 of indexing air cylinder 294. From the nip of the two power rollers 280,282 the tape passes over idler spindle 296 and then to a takeup spool 300 which is driven by pulley 302 (on the end of shaft 284), connected by belt 304 to pulley 306 and takeup spool shaft 308. The amount of takeup movement of the spool 300 is directly related to the amount of advancing movement of the tape by the drive rolls 280,282, since both are run off the ratchet drive connectors with the shaft 284, thus insuring a common drive.

Figure 4:
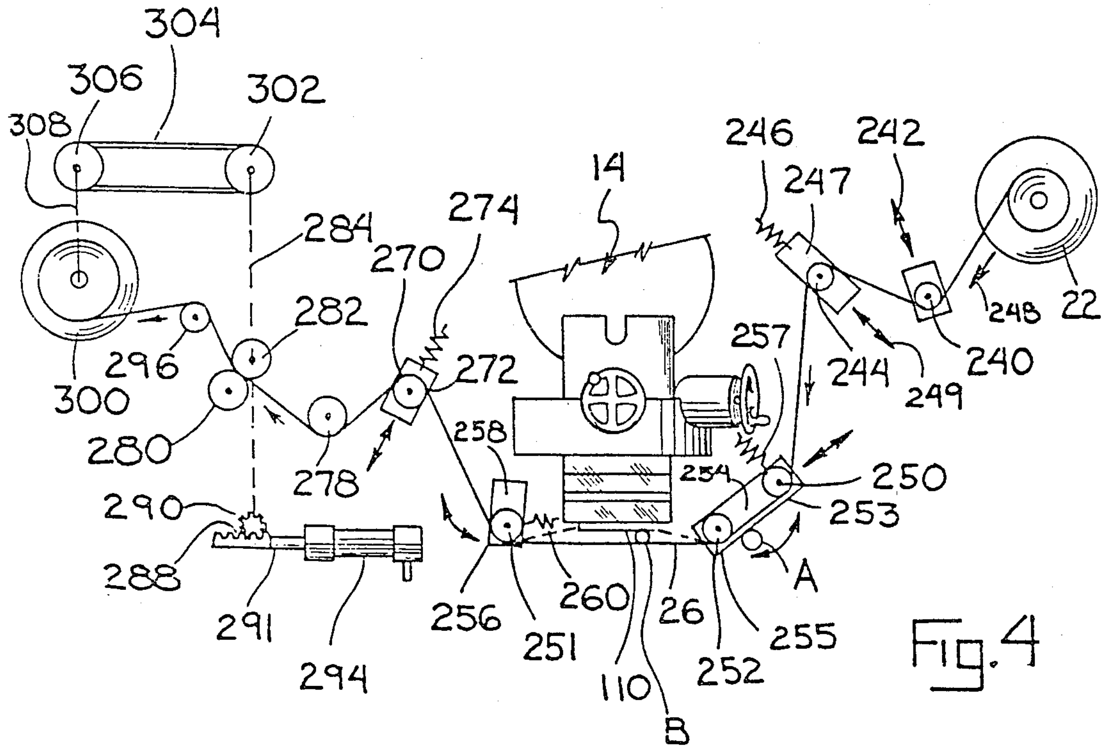
FIG. 4 illustrates in detail view, looking downwardly on the tape and supply leaf, its change-direction spindles and tensioning means whereby the tape is moved from a supply reel, its successive movements onto the takeup spool, the nip rollers for advancing the leaf, and the indexing air cylinder which is coordinated in operation with the containers as they move on the conveyor.
Figure 5:
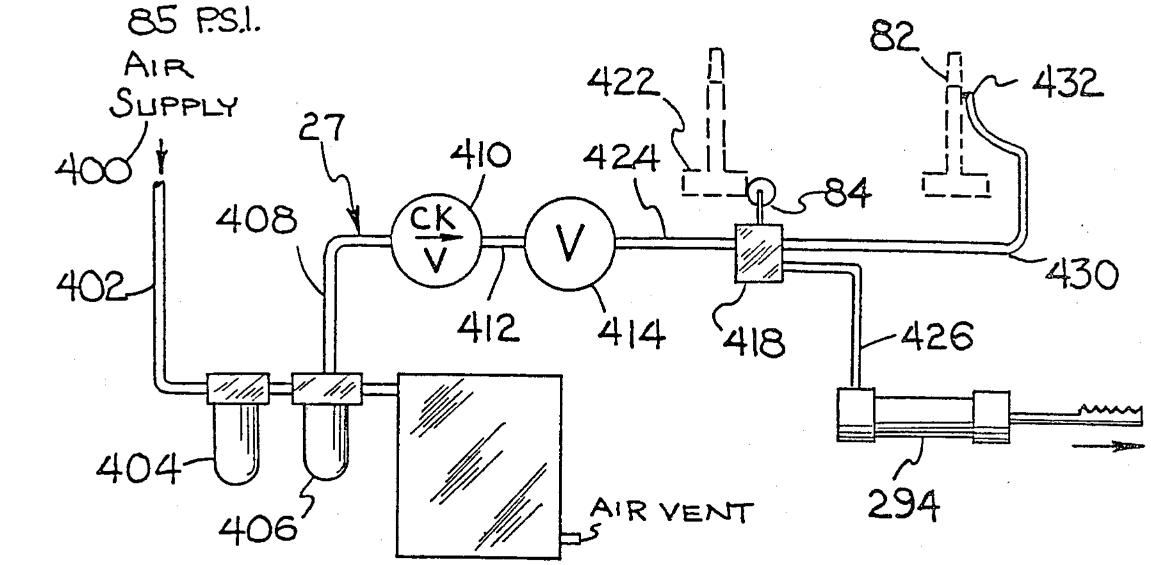
FIG. 5 is a block diagram illustrating the pneumatic means for advancing the leaf-and-tape and for "blowing off" the containers after they have been printed.

The purpose of the foregoing arrangement is so that the tape supply subassembly 22 will supply, in timed relation with a container, a fresh supply of foil of the length prescribed by the span 26 between spindles 252 and 251 in timed relation with the arrival of a container at location "A" in FIG. 4.

At this point, the container 10 biases the pivoted lever 255 clockwise about 254 against the resistance of spring 257 and forces the foil and tape toward the die face 110 so that at the time the container reaches point "B" (FIG. 4), the tape and foil are compressed between the rubber die 110 and the container or cap 10. The compressive force is between the foil facing the cap and the mylar tape, facing the die 110. The cap is, at this juncture, rotating, and as it rolls against the rubber die face 110, foil is transferred onto the surface of the cap in accordance with the pattern of the rubber die face 110.

After the cap moves the length of 26, the section 26 springs back to its initial position, and a fresh length 26 of tape is pulled off the supply reel 22 by means of air cylinder 294 acting through the shaft 284 and ratchet gear teeth connection 288, 290 operating the two drive rollers 280,282, which form a nip gripping the tape therebetween and advancing it, while simultaneously operating the takeup spool 300.

Air Operating Subassembly

The indexing air cylinder 294 (FIG. 5) is operated from an air supply 400 which receives air pressure typically at about 85 psi. Air line 402 passes through a moisture filter 404 and otler 406, line 408, through check valves 410, line 412, a Humphrey valve 414 through an indexing switch valve 418 which is controlled by indexing switch arm 420 operated by a cam follower 84 (FIG. 3), when one of the mandrel blocks 29 reaches the point of contacting 84 (FIG. 3).

At this time, the line 424 is connected through indexing switch valve 418 to line 426 operating the indexing air cylinder 294 (FIGS. 4,5), as previously described.

When the indexing air switch valve 418 is operated, there is also communicated through line 424, air leading to a blow-off opening 432 located at the lower left-hand part of the conveyor system (FIG. 3). The air blast is caught under an inverted printed cap, blowing the cap upwardly and off the reduced diameter end 38 of mandrel 36, making the mandrel available for a new unprinted cap which is loaded onto the mandrel at the cap fill station indicated by the legend in FIG. 3.

As illustrated in FIG. 1, the idler spindles provide a continuous support and direction for the progress of the leaf on the tape, from the supply reel 22 to the takeup reel 300, and provide sections 26 of foil as needed, in wrinkle-free condition, and under appropriate tension, this being obtained both by spring-loading the supply reel from a spring 319 (FIG. 1) and by locating the leaf at the proper location in relation to both the container and the hot die.

The operation as described operates at a speed controlled by speed control 186 (FIG. 6), and can produce printing through a force matrix on the die at that speed which insures proper surface-to-surface contact between die and cap (or container) even on an irregularly shaped cap, and insures precise contact within one-millionth of an inch.

The coating speed is considerable, and the operation can occur automatically and at high speeds, and at relatively low temperatures, but without deforming the plastic which is "hit" while the plastic is at a relatively high speed and sufficient temperature and pressure to effect virtually skip-free engraving. The machine operation is in the order of three times faster than previously known devices, uses less labor, obviates flame treatments, and can employ caps without requirement for the usual tolerances readily available for molded thermoplastic materials. The apparatus and process as described, automatically compensate for dimensional stability (or instability), and provide high quality printings in spite of relatively flexible walls of the containers.

The motor drive is approximately 100–1 speed ratio so that the belt can be driven from zero to approximately 100 rpm.

The die mechanism, leaf guides, mandrel design adjustments, are all variable.

The pneumatic system as described, instead of being an "or" circuit, can variously be both "and/or" and "/or", and is readily convertible to "and" circuits, as well as "and/or" circuits.

The air ejection system is variable in strength, and can vary in blast power, depending upon the size and configuration of the container being ejected. We are thus not dependent upon large blasts of air, but rely also upon a Venturi effect, or a turbulent effect, in the cap removal.

Figure 16:
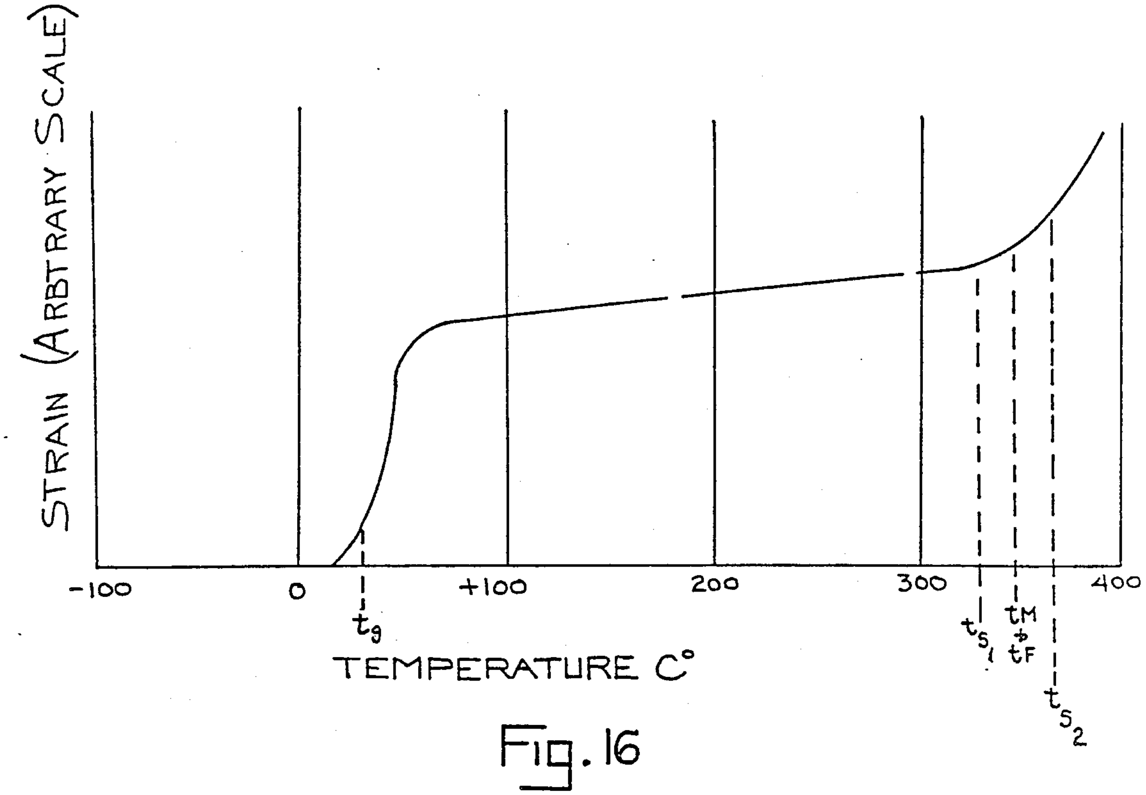
FIG. 16 is a graph illustrating the thermomechanical characteristics of most polymers. It depicts strain (deformation) vs. temperature. The temperature $T_G$ is the glass transition temperature showing a change from the glassy state to the rubbery state; $t_f$ and $t_m$ the temperature of the onset of viscoelasticity and of flow and melt respectively; $t_{s1}$ to $t_{s2}$, the temperature range for optimum hot-stamping in the visco-elastic region.

In operation, the hot-stamping occurs within the range $t_{s1}$–$t_{s2}$ which is the beginning of the viscoelastic state, as well as being the onset of surface flow, and this area is defined by the graph of FIG. 16. When the foil and the surface of the plastic are heated to this temperature range, and the pressure adjusted appropriately, a transfer of the foil will occur in a very brief time, in the order of 0.2 milliseconds. The contact between plastic and foil during this brief interval must be maintained, regardless of irregularities of the plastic surface within normal manufacturing tolerances of the part. It is the ability of the die mechanism previously described which allows the unprecedented high production rates.

Referring to FIG. 16, and defining its terms, we designated the glass-transition point as $t_g$, where transition from the "glassy" to the "rubbery" state occurs. What is below this temperature is the "glassy" state, and the long plateau which lies between $t_g$ and $t_{s1}$ is the rubbery state. We have shown $t_f$ and $t_m$, the temperature defining the onset of flow and melt respectively, as lying in the center of the optimum hot-stamping range $t_{s1}$ to $t_{s2}$; the range $t_{s1}$ to $t_{s2}$ can be considered as the range for the onset of flow ending with the onset of the melting, and this range is dependent upon the plastic composition. In the present invention, we insure that the factors of pressure and temperature achieve a viscoelastic state, defined by the range $t_{s1}$ to $t_{s2}$, when the hot-stamping takes place. Referring to FIGS. 18–21, the container or tape exhibit faulty "pick-off" owing to inadequate pressure or temperature, or both.

The present invention, unlike previous inventions which obtain a "hit and miss" method of hot-stamping, achieves its superior results by consistently obtaining, through a combination of the temperature and pressure considerations as well as dwell time, a hot-stamping within the viscoelastic region, and thereby obtaining a consistent, predictable hot-stamping which is appropriate to a given plastic-and-foil combination, as shown in FIG. 22. By properly applying the factors of time, pressure, temperature and particularly applying such parameters as they are related to a given hot-stamping application, it is possible to obtain consistent high quality hot-stampings, which have adhesion, high quality appearance, and which, yet, are obtainable by an efficient process characterized by high speed application.

These results are obtainable whether the force matrix is achieved by means of mechanical application of a matrix of spring forces or by solenoid means, or hydraulic means, all of which are within the teaching of the present invention.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims.

What is claimed is:

1. A method for hot-die transfer of metal or pigmented foil material onto circular plastic containers, comprising the steps of: mounting for individual rotation a series of such plastic containers onto spaced mandrels, indexing a substantially continuous sheet foil of predetermined length past a heated die which includes a die plate having means providing a substantially free universal movement of said die, said die plate providing information intended to be transferred as a permanent foil lamination onto the confronting surface of the plastic container, imposing on said die a controlled force matrix effecting substantially linear engagement between the plastic container and opposing die as the two are engaged under critical temperature and pressure to effect viscoelastic conditions on the surface of the container, said foil being compressed between the plastic container and die during such critical viscoelastic conditions, translating the container on the mandrel across the face of the die while permitting relatively free rotation thereof, and hot pressing the foil permanently onto the confronting surface of the container.

2. The process in accordance with claim 1, including the step of mounting at successively spaced locations on respective mandrels, individual containers, and continuously moving the mandrels with their respectively mounted rotatably received containers, successively past the die, in coordination with successively indexed sections of additional foil whereby the individual containers are hot stamped with the foil transferred thereon.

3. The process in accordance with claim 2, including the step of preliminarily adjustably disposing the die along mutually perpendicular horizontal, vertical and lateral axes and further adjustably positioning the die in an angular sense within horizontal and vertical plans containing said axes.

4. The process in accordance with claim 1, including the step of guiding said foil into printing position relative to said die through a series of change direction idler rollers, and providing tension controlled positioning relative to the die to effect lost motion tension-control on the foil in the vicinity of the die.

5. The process in accordance with claim 1, including mounting a plurality of spaced mandrels on an endlessly movable carrier which is formed in a closed loop to bring successive containers into stamping position, and thereafter ejecting the printed container after it has moved past the hot stamping station.

6. The process in accordance with claim 1, including the step of advancing the tape in timed relation with positioning each successive container on its associated mandrel to provide a further foil face in opposition to the die which is thereafter linearly engaged and traversed over the face of the foil by rotational movement of said container.

7. The process in accordance with claim 6, in which linear movement of the mandrel is translated into rotational movement by frictional engagement of a portion of the mandrel with a relatively nonmovable bearing surface against which the mandrel is controllably biased.

8. The process in accordance with claim 7, including the step of laterally and longitudinally adjusting and thereafter clamping the mandrel relative to the endlessly movable carrier in accordance with the initial and final mandrel positions respectively.

9. The process in accordance with claim 1 in which said die is controllably heated by electrical resistance elements, and providing a servo feedback from the die to effect on-and-off operation of said resistance elements.

10. The process in accordance with claim 1, including effecting the operation of a motor driven carrier and pneumatic control means for coordinating the removal of each container after it has been moved past the hot-stamping station and for positioning in coordination therewith leaf foil in successive replacement positions relative to the die for successive hot-stamping operations.

11. A hot stamping process including the steps of: heatng and pressurizing a substrate to a critical temperature and pressure to effect viscoelastic conditions on the surface of the substrate, applying metal or pigmented foil under pressure onto the heated substrate while it is at its critical viscoelastic condition, applying pressure between said foil and substrate through a force matrix including a universally movable die, maintaining such pressure between the foil and substrate as the substrate is held in its viscoelastic condition, and hot pressing the metal or pigmented foil permanently onto the confronting surface of the substrate to effect a permanent substantially flaw-free transfer of metal or pigmented foil onto the substrate.

* * * * *